July 19, 1927.
F. P. CASH
1,636,623
BEVEL AND SQUARE
Filed Aug. 4, 1921
2 Sheets-Sheet 1
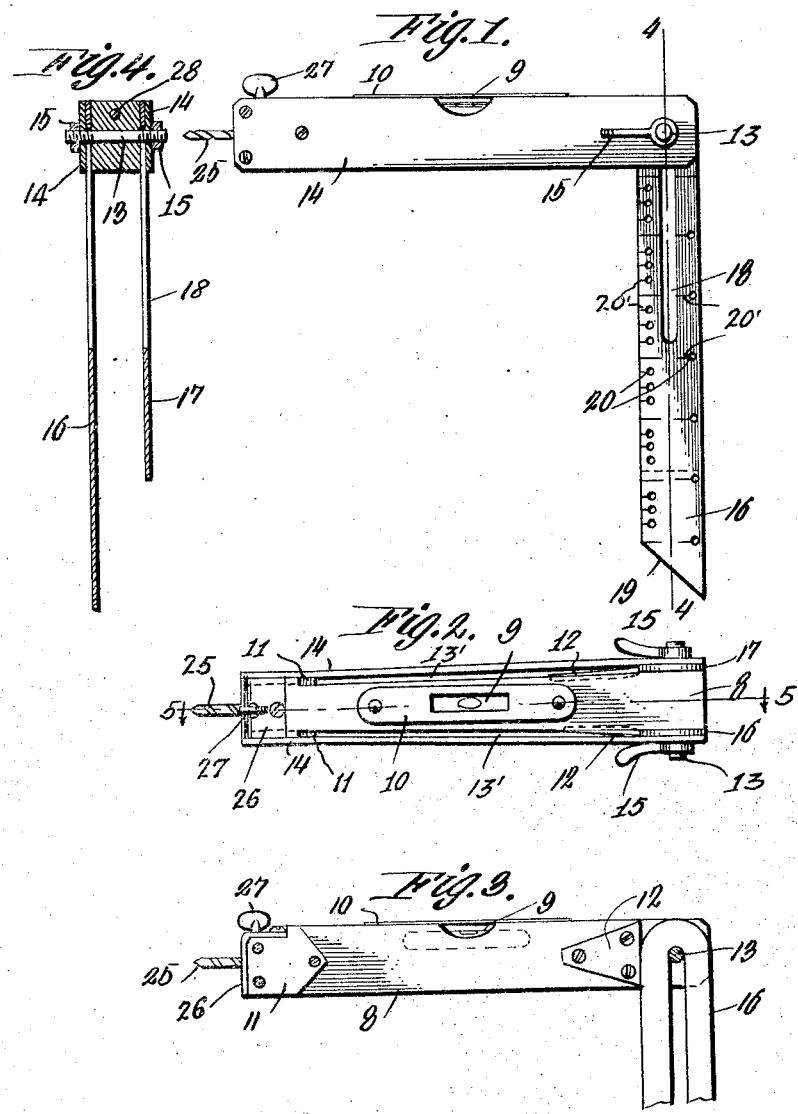

July 19, 1927.
F. P. CASH
BEVEL AND SQUARE
Filed Aug. 4, 1921
1,636,623
2 Sheets-Sheet 2
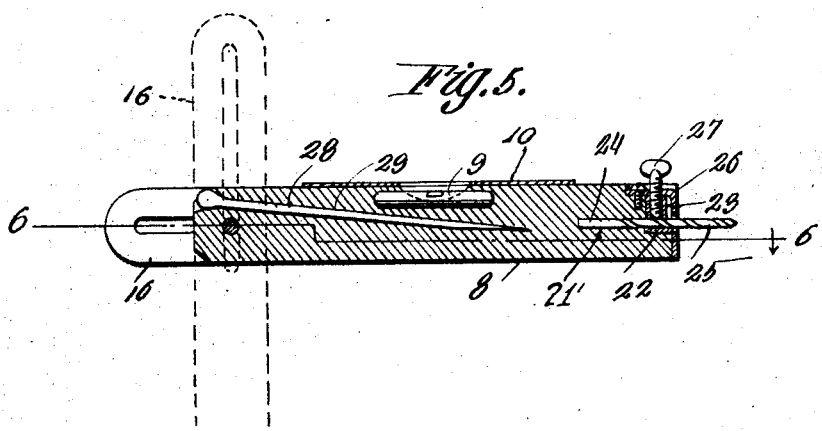
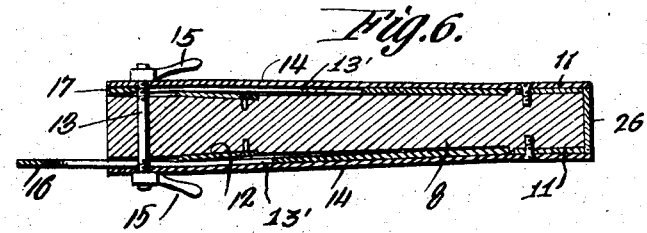
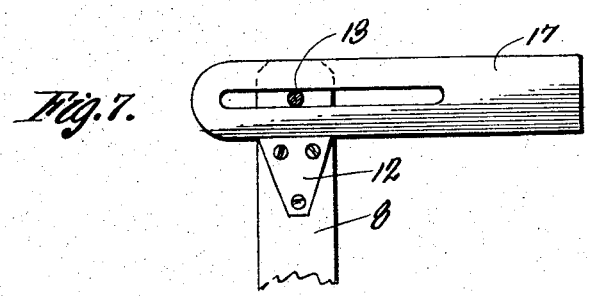
FRANK P. CASH INVENTOR.
WITNESSES
BY
ATTORNEY.

Patented July 19, 1927.

1,636,623

UNITED STATES PATENT OFFICE.

FRANK P. CASH, OF WINSTON-SALEM, NORTH CAROLINA.

BEVEL AND SQUARE.

Application filed August 4, 1921. Serial No. 489,732.

This invention relates to new and useful improvements in measuring instruments of the level and square type, the primary object of the invention being to provide an instrument embodying constructions whereby numerous measuring instruments may be provided with simple adjustments being made, the tool being capable of being rendered into a try-square, T-square, bevel square, weather boarding and ceiling square, gauge, rule, level, drill bit and scribe awl.

Another important object of the invention is to provide an instrument including a movable blade and having simple and inexpensive abutment means for retaining the blade in angular relation to the instrument.

A further object of the invention is to provide the instrument with a construction whereby the various instruments can be folded compactly when not in use.

A still further object of the invention is to provide the instrument with a body portion equipped with jaws for clamping a drill bit so that nail openings may be drilled while the work is being measured.

Other objects and advantages of the invention will become apparent during the course of the following description.

In the accompanying drawing forming a part of the application wherein like numerals are employed to designate like parts throughout the several views, Figure 1 is a side elevation of the instrument, Figure 2 is a top plan of the same, Figure 3 is a side elevation of the same with a plate removed, Figure 4 is a transverse section taken on the line 4—4 of Figure 1, Figure 5 is a longitudinal vertical section through the instrument on the line 5—5 of Figure 2, the blade of the instrument being shown in closed position in full lines and in open position in dotted lines, Figure 6 is a horizontal longitudinal section through the same, and Figure 7 is an enlarged fragmentary side elevation of a portion of the device.

In the drawings, wherein for the purpose of illustration is shown the preferred embodiment of my invention, the numeral 8 designates an elongated block, preferably constructed of hard wood but which may be made of any other material desired, and constitutes the body portion of the device. A spirit level 9 is embedded in the top surfaces of the body portion in a manner well understood and the glass tube thereof is protected by a guard plate 10. The body portion at one end is enlarged laterally to provide each side face with a laterally extending block 11 for a purpose which will presently appear. The inner end of each block 11, as best seen in Figure 3 is substantially V-shaped so as to accommodate parts to be presently described. From an inspection of the drawings it will be seen that the body has two opposite parallel sides and two other sides which are parallel each to each at the ends of the body and inclined toward each other from one of the parallel end portions to the other whereby the body has ends forming rectangular parallelepipeds and a central portion of rectangular form with its narrow end of less width than the adjacent end portion to provide a pair of shoulders.

An abutment 12 is provided for each side of the body portion from which extend the blocks 11 and as seen in Figure 3, these abutments are spaced from the end of the body portion. One end of each abutment, which in the present instance is a metal plate, is embedded in its respective side so that the opposite end of the plate projects laterally beyond the side as best seen in Figure 6. These plates are inclined from the sides of the body portion so that blades to be hereinafter described may be readily rotated into operative position. Of course, it will be appreciated that the arrangement of the abutments may be otherwise than indicated herein but the present construction appears to be least expensive.

A shank 13 having threaded ends extends transversely through the body portion between the abutments 12 and the end of the body portion, it being noted that opposite threaded ends of the shank or screw are extended beyond opposite sides of the body portion. This shank provides means for associating a pair of measuring blades 16 and 17 with the body portion and in a manner whereby the blades are pivotally and slidably associated with the instrument. Both blades are equipped with an elongated slot 18 through which the shank 13 extends. One end of each blade is rounded off or finished in any other desired manner, while the opposite end of the blade 17 is square with the longitudinal edges thereof, while the other end 19 of the blade 16 is cut off at an angle as clearly seen in Figure 1. Both blades may have dimensions and inscriptions thereon, and the blade 16 along both longitudinal edges is provided with a plurality of spaced apertures 20 which are arranged at various subdivisions of the scales 20' inscribed upon the blade.

It will be understood that when the longitudinal edges of the blade are arranged at right angles to the body portion their longitudinal edges will engage the edges of the abutments 12 which edges are arranged at right angles to the longitudinal dimensions of the body portion. A pair of thumb screws 15 is provided for reception upon the extended ends of the shank 13 for clamping the blades in any desired adjusted position.

Pockets 13' at opposite sides of the body portion for the reception of the blades are provided by fastening elongated resilient plates 14 to the lateral blocks 11. As best understood from Figure 6, it will be appreciated that one end of each resilient plate 14 is secured to its respective block 11, these plates are approximately the same dimensions as the sides of the body portion and the free end of each plate 14 is apertured for the reception of the extended end of the shank 13. As shown in Figure 2, the plates 14 are free from contact with the sides of the block 8 excepting for a slight contact therewith adjacent that end through which the shank 13 extends. Due to the gradually increasing diameter of the body 8 the plates 14 where they contact with the body at its widest point are so held that their free ends are normally maintained in spaced relation to the adjacent parallel side walls of the body. It will be understood that the thumb screws 15 are arranged upon the threaded ends of the shank 13 beyond the free ends of the plates 14 so that when the thumb nuts are tightened upon the shank, the free ends of the resilient plates 14 will be caused to move inwardly into clamping engagement with the sides of the blades 16 and 17.

A longitudinally extending opening 21' is provided in the end of the tool having the lateral blocks 11, and this end of the body portion is recessed from the top thereof down to the opening to communicate therewith. In the bottom of the recess I secure a plate 22 having a roughened surface to constitute a jaw. An internally threaded sleeve 23 is arranged in said recess above the jaw 22 for the reception of a set screw 27. The set screw is adapted to move relative to the sleeve to constitute another jaw; the sleeve being maintained fixed by a plate 26 bent to be secured to the end of the body portion and to form a closure for the recess. This closure plate is provided with an opening to aline with the opening in the body portion whereby the inner end 24 of a drill bit may be passed through the plate between the threaded sleeve and jaw 22 and into the longitudinally extending opening. After a bit has been so positioned, the set screw 27 is tightened to cause the inner end of the bit to clamp between the jaw 22 and the set screws so that the outer end of the bit 25 projects longitudinally of the body portion and beyond the end thereof.

The opposite end of the body portion is provided with a recess which communicates with a longitudinally extending bore 28 adapted to receive a scriber's awl 29.

To those skilled in the art, it will be obvious that the thumb screw 15 may be loosened to permit the blades 16 and 17 to swing out of their respective pockets and be angularly arranged with respect to the body portion to provide either a try-square T-square, or bevel square. It will also be obvious as to how the device may be used as a gauge, rule, level or drill and that the awl may be used for marking off measurements. When it is desired to reduce the width of a piece of material, the blade 16 is arranged with one edge abutting the abutment 12 and is clamped into this position by its thumb screw 15. The lower edge of the body portion is then placed upon a longitudinal edge of the material to be reduced, and the point of the awl is entered through any one of the openings 20 indicating the desired width the material is to be cut. The body portion is then moved longitudinally of the material and the point of the awl will describe a line parallel to the edge upon which the body portion slides. A cut can then be made along this line so that both edges of the material will be accurate.

To use the device as a weather boarding and ceiling square both blades 16 and 17 are adjusted to extend from the bottom of the instrument and at right angles to the body portion. These blades will be retained in such position by reason of the abutment 12 and thumb screws 15 clamping the side plates 14 into binding engagement with the blade. The weather board to be measured is secured horizontally between a pair of perpendicular supports and the lower edge of the body portion is placed upon the upper edge of the weather board so that the two blades straddle the same. A mark is then scribed along the outside or long edge of the blade 16 after which the weather board is sawed off to the scribed line and a perfect fit or joint will be effected.

The foregoing description and accompanying drawings have reference to what might be considered to be the approved or preferred form of my invention. I desire it to be understood that I may make such changes in the construction, combination and arrangement of parts, material, dimensions, etc., as may prove expedient and fall within the scope of the appended claim.

Having thus described my invention what I claim as new and desire to secure by Letters Patent is:

In an instrument of the class described, a body of general rectangular form having two parallel sides, the remaining sides of said body being parallel each to each at the ends of the body and inclined toward each other from one of the parallel end portions to the other whereby the body has ends forming rectangular parallelepipeds and a central portion of rectangular cross section, the narrower end of the rectangular portion being of less width than the adjacent parallelepidedal portion to provide a pair of shoulders adjacent the last mentioned parallelepidedal portion, cover plates, each cover plate being secured at one end to said body and closely engaging the last mentioned parallel portion, said cover plates being spaced from the rectangular portion and the remaining end of the body, a pivot bolt extending through the other ends of said cover plates and the last mentioned end of the body, clamp nuts threaded on the ends of said bolts to draw the cover plates toward said body, slotted blades normally positioned between the cover plates and body and having the bolt extending through the slots thereof, said blades being movable out of the spaces between the cover plates and body to assume angular relations with respect to the body, said blades being normally flat but capable of the deflection to enter said spaces, and stop plates carried by the body adjacent said bolt.

In testimony whereof I affix my signature.

FRANK P. CASH.